March 14, 1972 R. BONNEFILLE ET AL 3,649,364
METHOD FOR PRODUCING A MATERIAL FOR USE IN THE MANUFACTURE
OF OXYGEN ELECTRODES FOR USE IN FUEL CELLS ELECTRODES
Filed Jan. 26, 1970
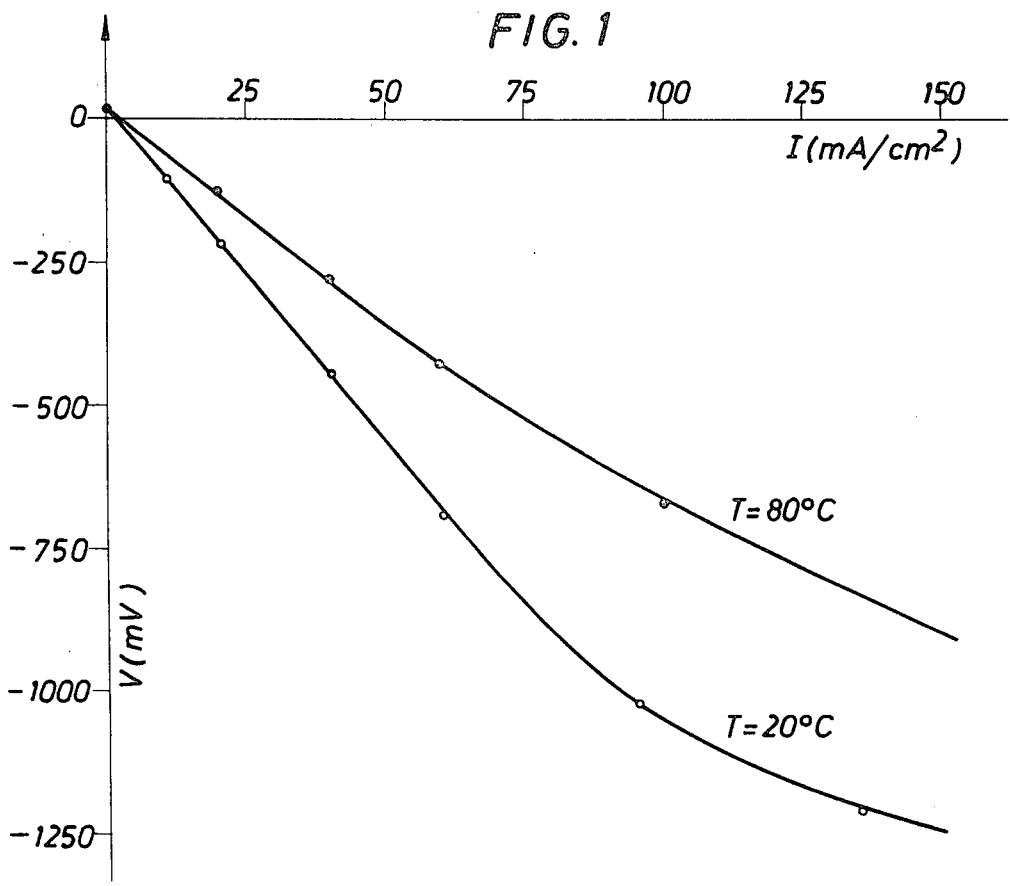
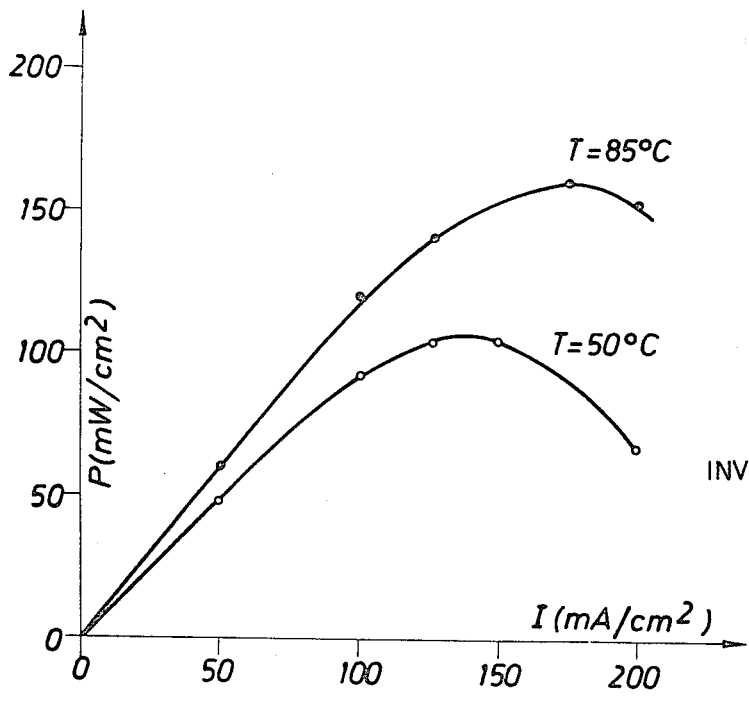
INVENTORS
Robert Bonnefille
Jean Francois Rialland
Jack Robert
BY Melville, Strasser,
Foster & Hoffman
ATTORNEYS

3,649,364
METHOD FOR PRODUCING A MATERIAL FOR USE IN THE MANUFACTURE OF OXYGEN ELECTRODES FOR USE IN FUEL CELLS
Robert Bonnefille, Issy-les-Moulineaux, Jean Francois Rialland, Paris, and Jack Robert, Palaiseau, Essonne, France, assignors to Etablissement Public: Agence Nationale de Valorisation de la Recherche "Anvar," Puteaux, France
Filed Jan. 26, 1970, Ser. No. 5,607
Claims priority, application France, Jan. 27, 1969, 6901569
Int. Cl. H01m *13/08;* C22f *1/00*
U.S. Cl. 136—120 FC                                    5 Claims

ABSTRACT OF THE DISCLOSURE

A method for transforming liquid metals or alloys such as an amalgam of indium into a powdery material includes the steps of rabbling or stirring the liquid metal or alloy in an oxygen atmosphere to form a viscous foam, and introducing the foam thus formed into water which is brought to boil where the gas is rapidly released to transform the liquid metal or alloy into finely divided particles. Next, the particles are filtered and dried. The resultant material is suitable for use when compressed and disposed in a stainless steel container as an oxygen electrode for a fuel cell.

---

The present invention relates to oxygen electrodes for use in fuel cells and to a method for producing a material for use in the manufacture of these electrodes.

From the study of sliding electrical contacts formed of liquid metal or alloys, in particular amalgams of indium the following phenomenon has been discovered: the liquid alloy which when stirred at low speeds does not undergo a change in physical state, but at high speed undergoes quickly a transformation into a black powdery material.

This seems to be a general phenomenon which occurs under conditions with other liquid metals and alloys such as gallium, the indium-gallium eutectic, Wood's alloy and the like. It is very likely that the transformation is related to the initial state of the surface of the amalgam; the state of the surface can be affected by the presence of a layer of absorbed gas and impurities.

This transformation is generally limited to the zone of the liquid immediately adjacent thereto, however, if the liquid is transformed into droplets of very small diameters, the zone enlarges and the droplets are transformed into solid particles. Further, if these particles are isolated for a sufficiently long period of time, the impurities come to the surface; it then becomes impossible to reverse the process and return the particles to the liquid mass.

An object of the present invention is a process for the transformation of liquid metals and alloys of the types hereinabove mentioned into powdery material for use in the production of oxygen electrodes for fuel cells.

An aspect of the invention consists in a method comprising:

Transforming a liquid amalgam into a viscous foam by rabbling or stirring in an oxygen atmosphere, introducing the foam thus formed into water which is brought to boil in order to effect the rapid release gas to finely divide the support phase while stirring the particles in the water, and Filtering and drying the particles at a suitable temperature.

Another aspect of the invention consists in an oxygen electrode for fuel cells comprising a stainless steel cylinder containing the powdery material produced according to the above-described method in a highly compressed condition, the outer surface of the cylinder being covered with an electrical insulator.

Other features and advantages of the present invention will become evident from the description of a method of preparing an amalgam of indium for use in the production of oxygen electrodes which follows, the description is made merely by way of examples with regard to the accompanying drawings in which:

FIG. 1 is a graph showing the effect of the temperature on the electrochemical activity of the powdered amalgam of indium according to the invention, and FIG. 2 is a graph showing the performance of a fuel cell having an oxygen electrode according to the invention.

The method of producing the powdery material from a liquid metal or alloy according to the invention comprises two principal steps:

First, an amalgam of indium is transformed into a viscous foam by rabbling or stirring the liquid in an oxygen atmosphere. The device used to achieve this result is for example a rotary blade capable of 200 r.p.m. which is immersed in the liquid. An enclosure is provided to maintain a desired atmosphere above the amalgam. Thus, for oxygen at a pressure of 1 bar, the transformation of 1 kilogram of an amalgam of indium (the proportion of indium is 10% by weight) takes place in approximately 10 minutes.

Second, the foam thus formed is introduced into water which is brought to boil. A rapid release of gas from the foam is thus effected. The oxygen, while being released, disperses and finely divides the support phase. The particles thus formed are sufficiently fine so that they remain in suspension in the water by stirring.

The indium which appears as an impurity has time to be dispersed, the surface of the particles are enriched thereby.

A powdery end product is formed after filtering and drying at 80° C. The end product consists of grains whose diameters are between 5 and 40 microns and is physically stable and capable of withstanding pressure of 200 tons/cm.$^2$ in compression.

A spectrographic analysis of the end product indicates that the amalgam undergoes a transformation of physical states when it becomes a powder. Indeed, a certain number of reticular planes have been observed in the powder amalgams.

The resistivity of the powdery material once it is compressed into a porous solid body depends on the degree of compression it has undergone, the composition of the starting amalgam as well as its granulometry.

By way of example, if the indium in the starting amalgam is 10%, the powder produced by the above-described method and compressed at a pressure of 15 tons/cm.$^2$ has a resistivity in the order of 1$\Omega \times$cm. at 20° C.

The amalgam of indium can adsorb oxygen. The catalystic properties of the body are related to its adsorbing property. Consequently the amalgam of indium is particularly useful as an oxygen electrode for fuel cells with basic media. The amalgam of indium is chemically stable relative to the alkaline solution.

The powdery material produced according to the invention is combined with metal fibers or strands in order to improve its mechanical strength and electrical conductivity and is placed in a stainless steel container. The combination of the powdery material and the metal fibers is compressed at a pressure of 15 tons/cm.² in order to form a disk whose mechanical as well as chemical resistance is convenient.

The outer surface of the metal container is electrically insulating, for example by a layer of the material known under the trade name "Araldite."

The electrode thus formed is placed in potassium hydroxide solution 5 N facing other electrode formed of stainless steel.

FIG. 1 is a graph showing the effect of temperature on the electrochemical activity of cell having an electrode of the material described hereinabove. Voltages are layed out on the ordinate relative to a $H_g$–$H_gO$ electrode. The pressure of oxygen is maintained between 2.5 and 3 bars. Under these conditions, the equilibrium is reached at the end of approximately three hours where $V=-10$ mv. at 20° C.

FIG. 2 is a graph showing the electrical performance of a cell having an oxygen electrode formed according the method described hereinabove and an electrode of an amalgam of sodium in which the amount of sodium is 0.75%. The distance between the electrodes is 2 mm. The pressure of oxygen is 3 bars and the mean temperature of the cell is from 50 to 85° C.

In these examples, the amounts of indium in the powdery material is 10% by weight.

The maximum electrical power is reached for the following values of current and voltage at 85° C.

I=260 ma. (at a current density of 170 ma./cm.²).
V=900 ma. (at 160 mv./cm.²).

It is of course understood that the present invention is not limited to the preparation of an amalgam of indium but may be applied in a general manner to the preparation of a powdery material from a liquid metal or alloy such as gallium eutectic, Wood's alloy or the like.

Furthermore the invention is concerned with any oxygen electrode produced from the powdery material formed of the material according to the above-described process.

We claim:
1. A method for transforming liquid metals or alloys into powdery material for use in making oxygen electrodes for fuel cells comprising the following steps:
   (a) rabbling a liquid metal or alloy in an oxygen atmosphere thereby transforming the liquid into a viscous foam,
   (b) introducing said viscous foam into water thereby releasing gas which transforms the foam into finely divided particles while concurrently stirring the particles in the water and
   (c) filtering and drying said particles.

2. A method as claimed in claim 1, further comprising compressing the filtered and dried particles in a metal cylinder.

3. A method as claimed in claim 2, wherein the metal cylinder is formed of stainless steel and the exterior of the cylinder has a coating of an electrical insulator.

4. A method as claimed in claim 2, wherein metal fibers or strands are added to the filtered and dried particles before they are compressed.

5. A method as claimed in claim 1, wherein said material is an amalgam of indium.

References Cited

UNITED STATES PATENTS

| | | | |
|---|---|---|---|
| 1,959,668 | 5/1934 | Gray | 75—169 |
| 2,523,789 | 9/1950 | Teare | 75—169 |
| 2,683,184 | 7/1954 | Boswell | 136—120 |
| 3,269,867 | 8/1966 | Fabel | 136—120 |
| 3,511,710 | 5/1970 | Jung et al. | 136—86 |

WINSTON A. DOUGLAS, Primary Examiner

M. J. ANDREWS, Assistant Examiner

U.S. Cl. X.R.

75—20 F